June 14, 1927.  
W. S. GRAHAM  
1,632,128  
DEPTH ADJUSTER FOR PLOWS  
Original Filed April 17, 1922   2 Sheets-Sheet 2

Inventor.
William S. Graham,
By W. P. Dowlin
Atty.

Patented June 14, 1927.

1,632,128

UNITED STATES PATENT OFFICE.

WILLIAM S. GRAHAM, OF CANTON, ILLINOIS, ASSIGNOR, BY MESNE ASSIGNMENTS, TO FRED GERLACH AND ARNOLD B. KELLER, TRUSTEES, BOTH OF CHICAGO, ILLINOIS.

DEPTH ADJUSTER FOR PLOWS.

Original application filed April 17, 1922, Serial No. 553,521. Divided and this application filed December 12, 1925. Serial No. 74,973.

This invention relates to wheel plows and more particularly to improvements in power lift devices by which power is derived from a supporting wheel to elevate and lower the plow bottom of such a plow, the invention being illustrated in application bearing Serial No. 553,521, filed April 17, 1922, of which this application is a division.

It is an object of the invention to provide a power lift which will afford a close adjustment of the depth at which the plow bottom operates in the soil.

A still further object is to provide a power lift with an effective plow depth adjuster which will preclude the possibility of accidental displacement of the connections for accomplishing the adjustment of the power lift.

Other objects will appear as the description progresses.

A plow embodying a power lift constructed in accordance with the teachings of this invention is shown in the accompanying drawings, in which.

The illustrative plow, in which two plow bottoms are shown to be capable of independent vertical movement, comprises means including a radially adjustable pivot block 33 the position of which determines the depth at which its connected plow bottom will operate in the soil. In this instance the pivot block is slidably mounted upon a crank arm which extends at a right angle to a power lift clutch shaft. The crank arm is preferably offset relative to an extended radius of the clutch shaft so as to promote effective operation of the power lift. Accidental removal of the pivot block is prevented by the laterally bent end of the crank arm.

Actuated by the crank arm and its pivot block 33 is a link 35 which transmits the variable and effective throw of the crank arm to the plow frame in the form of a plow lifting or lowering movement. The vertical limits of the movements of this link are governed by the positions of the pivot block 33, the adjustment of which lengthwise of the crank arm may optionally be used to increase the mechanical advantage involved in the application of power derived from the supporting wheel. As the pivot block is moved away from the laterally bent end of the crank arm, the supporting wheel will overcome greater resistances in lifting the plow frame and plows.

Figure 4:
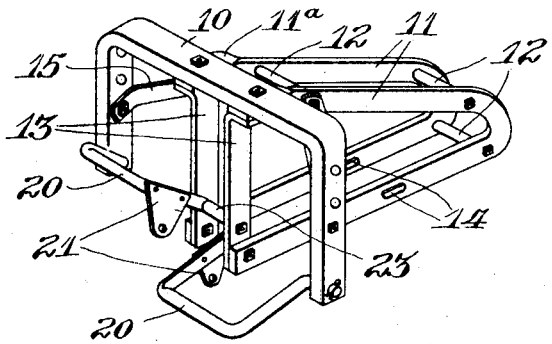
Fig. 4 is a perspective view of the frame of the illustrative plow.

Other novel features of construction are included in the illustrated plow which will now be described. For the sake of clarity of disclosure, the assembled elements which comprise the plow frame are shown in Fig. 4 of the accompanying drawings as detached from the other parts of the entire plow structure. This frame comprises an arch, or inverted U-shaped member 10, preferably constructed of heavy bar material so as to serve as a basis for the entire plow structure. For purposes which will hereinafter appear, V-shaped frame members 11 spaced apart by suitable bolts and spacing sleeves 12 are secured rigidly to the arch 10. The upper ends of the members 11 are twisted as indicated at 11ª so as to effectively engage the lower surface of the bar 10 and thereby promote rigidity of the frame structure. The lower portions of the members 11 are reversely bent and have their ends rigidly secured to uprights 13, which, in turn, are rigidly secured at their upper ends to the bar 10, as shown.

Slots 14 are provided in the lower portions of the members 11 for purposes which will hereinafter appear, and the frame is strengthened by diagonal braces 15 connecting the downwardly extending arms of the arch 10 with the frame members 11. These braces operate to prevent displacement of the forwardly projecting frame members 11 relative to the arch 10 and materially rigidify the frame, which is subject to severe twisting strains in use.

Draft is transmitted to the plow by means of a hitch member, or draft device 16, preferably pivotally related to the frame members 11 and formed of a single bar bent into U-shape form with its forward ends in contact so as to enable a clevis to be advantageously applied thereto. This draft device fits snugly between the two frame members 11, as clearly indicated in Fig. 1, and at its sides is provided with straps 17 which extend rearwardly and on the outside of the respective frame members 11. The bars 16 extend between the two foremost spacing sleeves 12 so that the vertical pivotal movements of the draft device will be limited thereby.

Interposed between the above described frame members 11 and the corresponding strap 17 are plow beams 18 which have their forward ends provided with slots, as indicated at 18$^a$. A suitable draft pin 19 extends through the draft device and through the slots 14 in the frame members 11 as well as through the straps on the outside of the draft device. This pin is also engaged in the slots 18$^a$ in the forward ends of the plow beams. Bails 20 are pivotally mounted in the lower ends of the arms of the arched member 10 and the uprights 13. These bails are preferably provided with their inner arms flattened so as to receive downwardly extending plates 21, which are riveted thereto. The outer portions of the bails have out-turned ends which are received within perforations of the arms of the arch. The inner arms of the bails are in engagement with the inner surfaces of the uprights 13 and are perforated so as to receive a bolt passing through the bail, the uprights 13 and a spacing sleeve 23 interposed between the inner arms of the bails. Each bail has journaled thereon a supporting bracket 25 which is bolted to a plow beam 18.

Figure 1:
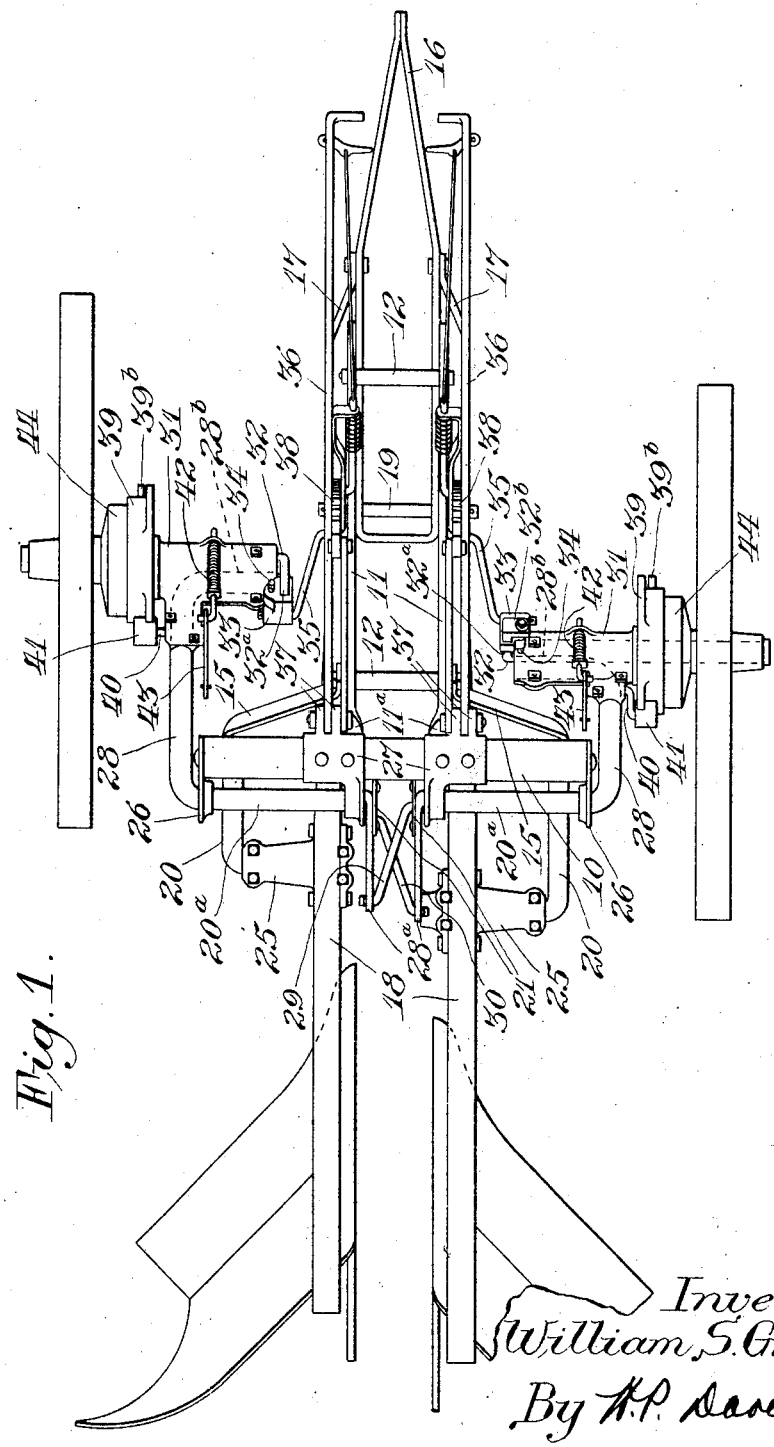
Fig. 1 is a plan view of a two-way plow with the illustrative power lift incorporated therein.

The arch 10 has a bearing plate 26 secured to each arm and other plates 27 are bolted to the horizontal portion of the arch, as clearly shown in Fig. 1. These bearing plates provide horizontally alined journals which receive the horizontal portions of crank axles 20$^a$. At the opposed and spaced ends of these crank axles, rearwardly extending crank arms 28$^a$ are provided. The opposite ends of these crank arms extend downwardly and forwardly and thence inwardly, the inwardly extending portions 28$^b$ being parallel to the upper portions of the crank arm. These lower parallel portions are shown in dotted lines in Figs. 1 and 2. A link 29 connects the crank arm 28$^a$ at the left side of the plow with the plate 21 on the bail 20 at the right hand side of the plow, a second link 30 operatively crossing the first link 29, as clearly shown in Fig. 1, so as to connect the crank axle on the right hand side of the plow with the bail 20 on the left hand side.

Figure 3:
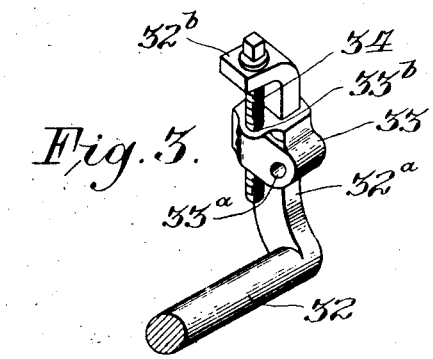
Fig. 3 is a perspective view of the parts by which the plow depth adjustment is effected.

The lower and inwardly turned ends 28$^b$ of the crank axles 28 have bearing brackets 31 clamped thereto so as to rotatively support therein clutch shafts 32. Each clutch shaft is formed at its inner end with a crank arm 32$^a$ having a laterally bent end, as indicated at 32$^b$ in Fig. 3. On each crank arm 32$^a$ there is slidably mounted a pivot block 33 having a horizontal opening 33$^a$ and a vertical opening 33$^b$. The vertical opening is threaded to receive an adjusting screw 34. This adjusting screw passes through the laterally bent end of the crank arm so that by turning the adjusting screw the pivot block 33 may be moved relative to the bent end 32$^b$, and firmly held in its adjusted position. Pivotally mounted within the openings 33$^a$ of the pivot block are lifting links 35 which are pivoted at their upper ends to levers 36, which may be adjusted to alter the horizontal positions of the plows with respect to the plow frame. These levers 36 are pivoted to the frame by means of lugs 37 formed on the brackets 27. Conventional racks 38 cooperate with suitable detent mechanisms to hold the levers 36 in their adjusted positions.

The crank arms 32$^a$ of the respective clutch shafts 32 are offset with respect to an extended radius of the clutch shaft so that the links 35 will assume the proper position in alinement with the centers of shafts 32 at the termination of each lifting or lowering movement of the shaft.

Each clutch shaft 32 has a clutch mechanism mounted upon its outer end. Each clutch mechanism comprises a plate 39 mounted so as to be non-rotative relative to the shaft 32. Each plate 39 is provided with oppositely arranged notches 39$^a$, as well as with oppositely arranged clutch dogs 39$^b$. Cooperating with the notches 39$^a$ and mounted so as to engage the clutch dogs 39$^b$, is a trip 40 mounted on each bracket 31 and provided at its end with a roller 41. A compression spring 42 engages an upright arm 43 which is an extension of the trip 40 opposite the roller 41. This spring abuts against a lug on the bracket 31 so as to press the roller 41 toward the clutch plate 39. To each arm 43 is secured a trip rope through which actuation of the clutch is controlled in a well known manner. Each clutch also comprises a casing 44 which is fixed to a supporting wheel so as to rotate therewith on the shaft 32. This casing is provided with internal notches on its annular flange, the inner ends of the clutch dogs 39$^b$ engaging these internal notches in a well known manner when the clutch dogs are released by a pull upon the trip rope.

When the clutch dogs 39$^b$ are engaged with the internal teeth on the annular flange of the casing 44, the supporting wheel and the shaft 32 will rotate in unison until the roller 41 falls into an opposite notch. This movement imparts a half revolution to the power shaft and its crank arm 32$^a$ at each operation of the clutch mechanism, thereby shifting the supporting wheel in opposite directions alternately. As the clutch mechanism is of a type commonly used in this art, it is believed that more extended description is unnecessary, it being understood that either axle will be moved alternately upwardly and downwardly at each successive actuation of the clutch mechanism connected thereto. Through the connections above described each shifting of a crank axle 28 results in the shifting of the plow upon the opposite side of the frame, in a reverse direction.

By adjustment of the screw 24, the pivot mounting of the lower end of the link 35 is shifted substantially radially of the crank arm 32ª, correspondingly varying the effective throw of the crank arm. By the expression "effective throw of the crank arm" reference is made to such a throw as that which would be provided by a crank arm, the outer end of which terminated in the pivot block 33, the position of which, in applicant's plow, governs the range of the lifting and lowering movements of the plow. Further adjustments to regulate the positions of the plows roughly relatively to the ground is possible by the adjustment of levers 36. These levers operate to raise and lower the wheels and plows without affecting the throw of the power lift clutch.

Figure 2:
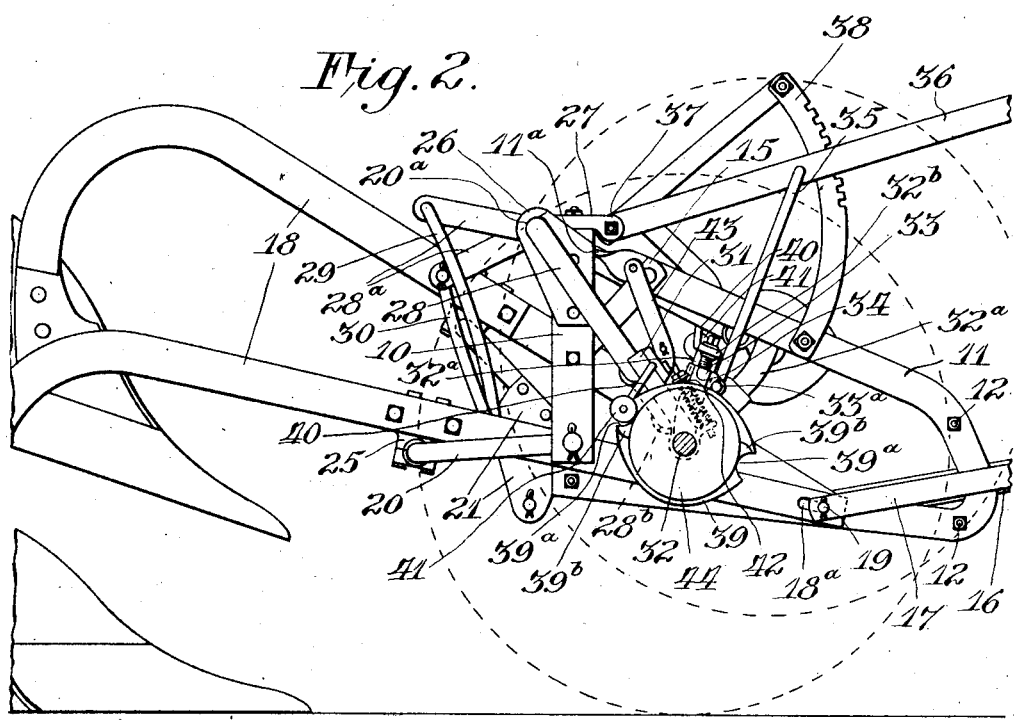
Fig. 2 is an elevation of the plow shown in Fig. 1 with one of the supporting wheels removed.

In operation, after the first furrow has been opened, the plow parts would assume the position shown in Fig. 2, and the operator on reaching the end of the field would trip the clutch on the land wheel. This would cause that wheel to swing downwardly to an extent equal to the desired depth of plowing, which normally varies from 5 to 10 inches. Assuming that the left hand or upper supporting wheel in Fig. 1 has had its attached clutch tripped, the downwardly extending crank of the upper crank arm 28ª will swing downwardly. This causes the bail 20 on the opposite side of the frame to swing upwardly by reason of the connecting link 29.

The operator is now ready to turn his machine in position for making the return furrow. He will next trip the clutch on the opposite wheel, which then becomes the land wheel. This causes the opposite plow to be lowered to the plowing depth, and also levels the frame.

It is important to note that as each bail 20 swings upwardly or downwardly to correspondingly raise or lower its plow beam, the beam will be given a slight longitudinal movement. The bail is in substantially horizontal position when the plow is down, upward movement of the bail causing the beam to move forward, and downward movement of the bail causing the beam to move rearwardly. This longitudinal movement of the plow beams causes the release of each beam from contact with the draft pin 19 as the beam is raised. This action is due to the fact that the slot 18ª in the forward end of each beam will allow the beam to slide forwardly as it is being raised. In this manner practically the full draft power is applied to the lower beam as the slots 18ª in the frame members allow the draft pin 19 to draw back with the lowered beam and allow the pin to move forwardly to the ends of the slots 18ª when the plows are raised. When both plows are raised, the draft will be transmitted equally to both frame members 11.

The specific details of construction, arrangement and mode of operation of the illustrative device may be variously modified to suit various conditions or requirements, within the scope of the appended claims.

Having described my invention, I claim:

1. The combination with a power lift device comprising a frame, a cranked axle journaled thereon, a wheel on the cranked axle, traction actuated clutch mechanism connected to the wheel and including an intermittently rotatable member and a link eccentrically pivoted thereto, said link having its upper end pivoted on the frame; of means for adjustably varying the eccentric relation between said rotary member and link.

2. The combination with a power lift device comprising a frame, a cranked axle journaled thereon, a wheel on the cranked axle, traction actuated clutch mechanism connected to the wheel and including an intermittently rotatable crank arm and a link, said link being connected to said frame and to said crank arm; of means embodied in the connection between the crank arm and link for varying the effective length of the crank arm.

3. The combination with a power lift device comprising a frame, a cranked axle journaled thereon, a wheel on the cranked axle, traction actuated clutch mechanism connected to the wheel and including an intermittently rotatable crank arm and a link, said link being connected to said frame and to said crank arm; of means for adjusting the point of connection between the crank arm and link comprising a member movable on the crank arm and to which the link is pivoted, and means for retaining said member at adjustment on the crank arm.

4. The combination with a power lift device comprising a frame, a cranked axle journaled thereon, a wheel on the cranked axle, traction actuated clutch mechanism connected to the wheel and including an intermittently rotatable crank arm and a link, said link being connected to said frame and to said crank arm; of means for adjusting the point of connection between the crank arm and link comprising a block movable on the crank arm towards and from its end and to which the link is pivoted, and a screw connection for moving the block on the crank arm.

5. The combination with a power lift device comprising a frame, a cranked axle journaled thereon, a wheel on the cranked axle, traction actuated clutch mechanism connected to the wheel and including an intermittently rotatable crank arm and a link, said link being connected to said frame and to said crank arm; of means for adjusting the point of connection between the crank arm and link comprising a pivot block slidably adjustable on the crank arm and to which the link is pivoted, an angular projection on the end of the crank arm constituting a stop for said block, and an adjusting screw passing through the pivot block and rotatable in the angular projection on the end of the crank arm.

6. The combination with a power lift device comprising a frame, a cranked axle journaled thereon, a wheel on the cranked axle, traction actuated clutch mechanism connected to the wheel and including an intermittently rotatable crank arm and a link, said link being connected to said frame and to said crank arm; of means for adjusting the point of connection of the link and the crank arm radially of the crank arm.

7. In a power lift plow, the combination of a multiple beam plow frame, a forward and downwardly extending crank axle rotatably mounted in said frame, a supporting wheel mounted upon the lower end of said crank axle and rotatable with respect thereto, a clutch axle rotatable relative to said crank axle and passing through said wheel to afford an axle therefor, a lifting link interposed between the inner end of the clutch axle and the frame, the lifting link being pivotally related to the clutch axle on an axis eccentrically related to the axis of the clutch axle, means for optionally varying the eccentricity of said pivotal connection, and a clutch mounted on said clutch axle for effecting successive, intermittent, unidirectional rotary movements of said clutch axle to effect relative vertical movements of said wheel and the frame.

In testimony whereof I affix my signature.

WILLIAM S. GRAHAM.